United States Patent [19]

Chattha et al.

[11] Patent Number: 5,766,562
[45] Date of Patent: Jun. 16, 1998

[54] DIESEL EMISSION TREATMENT USING PRECIOUS METAL ON TITANIA AEROGEL

[75] Inventors: Mohinder S. Chattha, Northville; Tjenga E. Hoost, Redford; Robert J. Kudla, Warren, all of Mich.

[73] Assignee: Ford Global Technologies, Inc., Dearborn, Mich.

[21] Appl. No.: 814,068

[22] Filed: Mar. 10, 1997

[51] Int. Cl.$^6$ .................................................. B01D 53/94
[52] U.S. Cl. ........................... 423/213.5; 423/239.1
[58] Field of Search ........................... 423/213.5, 239.1

[56] References Cited

U.S. PATENT DOCUMENTS

| | | | |
|---|---|---|---|
| 4,207,209 | 6/1980 | Matsuda et al. | 423/213.5 |
| 4,233,183 | 11/1980 | Inaba et al. | 423/213.5 |
| 4,293,447 | 10/1981 | Inaba et al. | 423/213.5 |
| 4,297,246 | 10/1981 | Cairns et al. | 423/213.5 |
| 4,791,091 | 12/1988 | Bricker et al. | 423/213.5 |
| 5,200,384 | 4/1993 | Funabiki et al. | 423/213.5 |
| 5,294,584 | 3/1994 | Yoshida et al. | 502/242 |
| 5,403,513 | 4/1995 | Sato et al. | 423/612 |
| 5,505,769 | 4/1996 | Dinnage et al. | 96/153 |
| 5,538,931 | 7/1996 | Heinrichs et al. | 502/234 |

OTHER PUBLICATIONS

M. Schneider, D. G. Duff, T. Mallat, M. Wildberger, and A. Baiker, "High Surface Area Platinum–Titania Aerogels: Preparation, Structural Properties, and Hydrogenation Activity," 1994, pp. 500–514, Journal of Catalysis 147 (no month).

*Primary Examiner*—Steven Bos
*Assistant Examiner*—Peter DiMauro
*Attorney, Agent, or Firm*—Lorraine S. Melotik

[57] ABSTRACT

The invention is a method for treating exhaust gases generated by a diesel engine by providing a sulfur-tolerant lean-NOx catalyst in an exhaust gas passage of the engine and contacting the catalyst with the exhaust gases. The sulfur-tolerant lean-NOx catalyst comprises a support of titania aerogel; and loaded thereon, using impregnation techniques from a solution of their precursors, at least 0.25 weight percent precious metal selected from platinum, palladium, rhodium, or mixtures thereof. The method converts the hydrocarbons, carbon monoxide and nitrogen oxides into more desirable gases. In particular, the NOx is converted to $N_2$ and $O_2$ over the catalyst.

9 Claims, 2 Drawing Sheets

5,766,562

1

DIESEL EMISSION TREATMENT USING PRECIOUS METAL ON TITANIA AEROGEL

FIELD OF THE INVENTION

This invention relates to a method of treating exhaust emissions from diesel engines by exposing the emissions to a sulfur-resistant catalyst comprising precious metal like platinum deposited on a titania aerogel support.

BACKGROUND OF THE INVENTION

Catalysts are employed in the exhaust systems of automotive vehicles to convert the carbon monoxide, hydrocarbons, and nitrogen oxides ($NO_x$) produced during engine operation into more desirable gases like carbon dioxide, water, nitrogen and oxygen. When the engine is operated in a stoichiometric or slightly rich air/fuel ratio, i.e., between about 14.7 and 14.4, catalysts containing precious metal like palladium and rhodium are able to efficiently convert all three gases simultaneously. Hence, such catalysts are often called "three-way" catalysts.

Diesel engines have received widespread use because of the fuel economy attainable by such engines. Such engines operate under "lean-burn" (excess-oxygen) conditions where the A/F ratio is generally between 19 and 40. While conventional three-way catalysts are able to convert carbon monoxide and hydrocarbons during lean-burn operation, they are less than efficient in the reduction of $NO_x$ during lean-burn diesel operation. Thus, using such three-way catalysts for treating diesel engine emissions has generally resulted in inadequate NOx reduction with a concurrent increase in particulate emissions.

Numerous catalysts have been developed specifically to operate in lean-burn situations and effectively convert hydrocarbons, carbon monoxide as well as the NOx, hence such catalysts are often termed lean-NOx catalysts. Stricter emission standards in the future will require improved lean-NOx catalysts. Lean-NOx catalysts useful in gasoline operations are often not equivalently suitable for diesel operations. Diesel exhaust gas is lower in temperature, generally 200° C. to 600° C., as compared to gasoline exhaust gas. Hence, the lean-NOx diesel catalyst must be able to convert NOx at lower temperatures than would be suitable for a gasoline NOx catalyst. Another special property required for diesel catalysts is that they be sulfur resistant since diesel fuel generally contains higher amounts of sulfur than gasoline fuel. Sulfur compounds like $SO_2$ and $SO_3$ (SOx) present in the fuel can react chemically with the catalyst support so that the catalyst is less effective for converting exhaust gases. For example, sulfur reacts with conventional alumina supports to form sulfate compounds which reduce the surface area of the support. In diesel situations because exhaust gas temperatures are generally lower, there is less opportunity to desorb the deactivating sulfur as compared in gasoline-powered engine applications. Hence, it is desirable that a diesel lean-NOx catalyst be highly resistant to sulfur poisoning.

Titania is known to have a lower propensity to adsorb sulfur than alumina. Unfortunately, however, catalysts like platinum loaded onto conventional titania supports typically tend to exhibit significantly lower NOx conversion efficiency than a platinum on alumina equivalent.

We have unexpectedly found that precious metal like platinum when provided by impregnation onto a titania aerogel support material has excellent NOx conversion efficiency. And it is resistant to sulfur poisoning. Aerogel materials are prepared by techniques which include gelation and subsequent supercritical extraction of the organic solvent from the gel. When employed to convert a simulated diesel exhaust containing sulfur, the invention catalyst was found to exhibit NOx conversion efficiencies on the order of 10% higher than an equivalent platinum on a commercially available conventional titania support. Hence, the present invention catalyst overcomes the deficiencies of prior lean-NOx catalysts and is ideally suited for use in diesel applications to treat the exhaust gases.

The article "High Surface Area Platinum-Titania Aerogels: Preparation, Structural Properties, and Hydrogenation Activity", M. Schneider et al., Journal of Catalysis 147, 500–514 (1994) discloses Pt-titania aerogels made by co-gelling of platinum and titania precursors. This aerogel is suggested as a liquid-phase catalyst for hydrogenation of trans-stilbene and benzophenone. The use of meso- to macroporous titania aerogels conventionally impregnated with platinum salts was taught to afford hardly any improvements for fine chemical synthesis as compared to the Pt-titania co-gelled aerogel.

DISCLOSURE OF THE INVENTION

This invention is directed to a method for reducing the NOx concentration of diesel engine exhaust gases which comprises providing a sulfur-resistant lean-NOx catalyst in the exhaust gas system of a diesel engine and exposing the gases thereto. The lean-NOx diesel catalyst employed in the invention method comprises at least 0.25 weight percent precious metal selected from the group consisting of platinum, palladium, rhodium, and mixtures of any of them, preferably comprising at least platinum, impregnated from a solution thereof onto an aerogel titania porous support. The weight percent of the precious metal is based on the weight of the aerogel titania support. In addition to reducing the NOx concentration in the diesel emissions by conversion to nitrogen and oxygen, the lean-NOx catalyst also converts the carbon monoxide and hydrocarbons to more desirable gases.

Advantageously we have found that the catalyst of the present invention is able to convert diesel exhaust gases at relatively low temperatures and to a significantly greater extent than that of prior lean-burn catalysts and is also much more resistant to sulfur poisoning.

The comparative catalysts are 1% Pt supported on: conventional titania rutile of 3.3 $m^2$/g (open circles), titania anatase of 10 $m^2$/g (open squares), and titania anatase of 41 $m^2$/g (solid circles).

Figure 2:
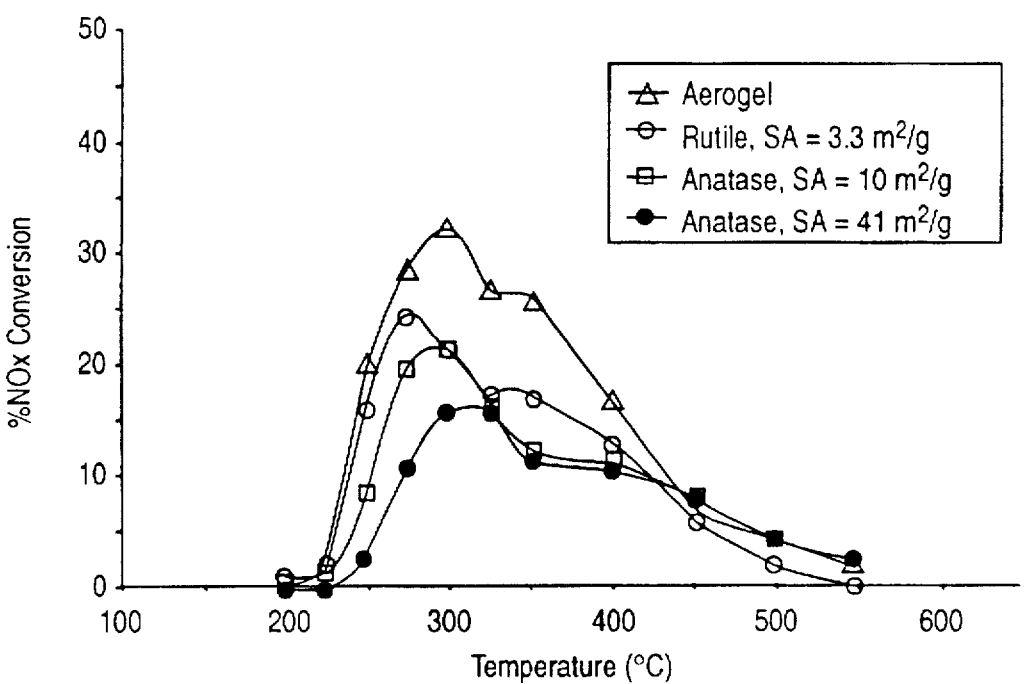

FIG. 2 is a graph showing NOx conversion as a function of catalyst temperature for a 1% Pt catalyst according to the embodiment of the present invention (open triangles) and three comparative catalysts, using a simulated exhaust gas containing 15 ppm sulfur dioxide. The comparative catalysts are 1% Pt supported on: conventional titania rutile of 3.3 $m^2$/g (open circles), titania anatase of 10 $m^2$/g (open squares), and titania anatase of 41 $m^2$/g (solid circles).

Figure 3:
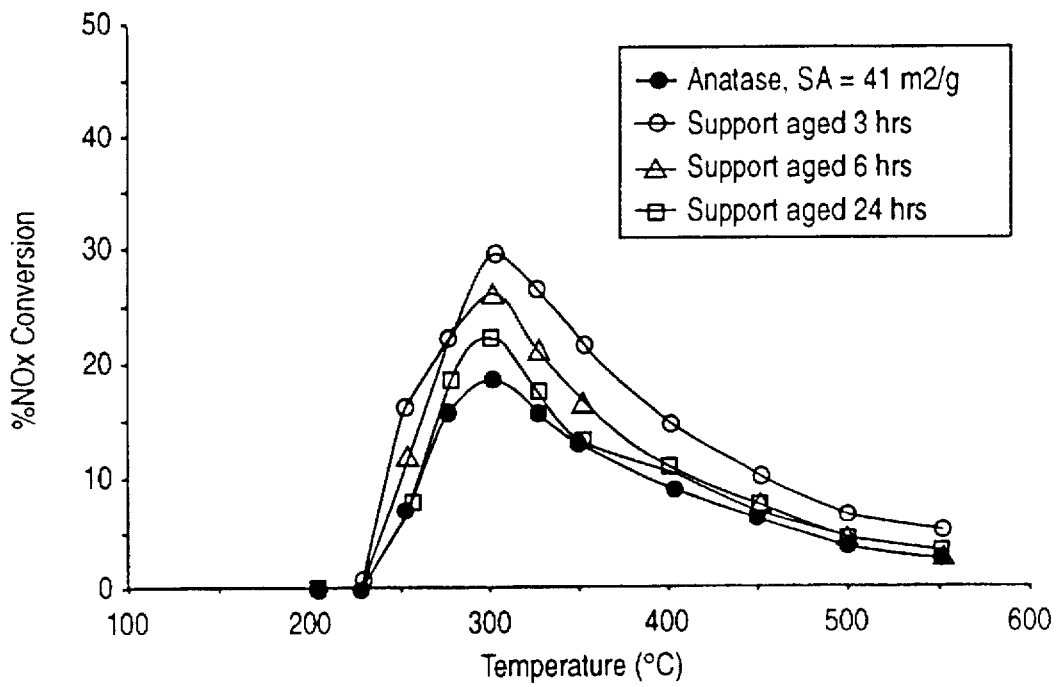

FIG. 3 is a graph showing the NOx conversion in the absence of sulfur dioxide as a function of catalyst temperature for samples of a 1% Pt comparative catalyst where the titania anatase support of 41 $m^2$/g had been pre-aged for different durations at 800° C. The respective durations were 0 hours (solid circles), 3 hours (open circles), 6 hours (open squares), and 24 hours (open triangles).

Figure 4:
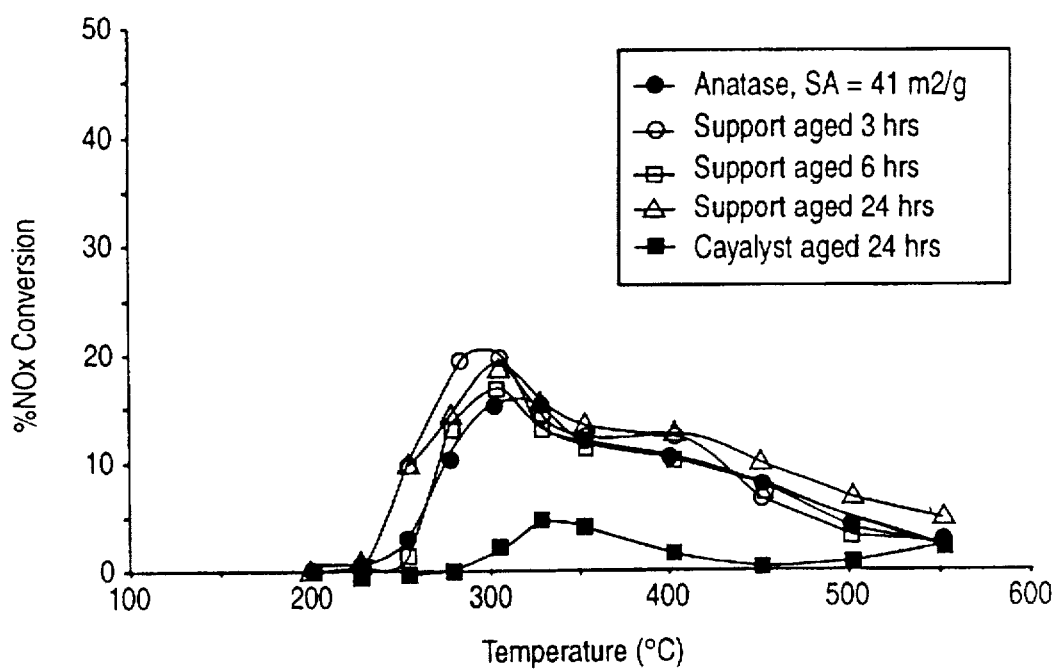

FIG. 4 is a graph showing the NOx conversion in the presence of 15 ppm sulfur dioxide as a function of catalyst temperature for samples of a 1% Pt comparative catalyst where the titania anatase support of 41 m$^2$/g had been pre-aged for different durations at 800° C. The respective durations were 0 hours(solid circles), 3 hours(open circles), 6 hours(open squares), and 24 hours(open triangles). The graph also shows the temperature dependence of the NOx conversion for a sample of the 1% Pt comparative catalyst supported on titania anatase of 41 m$^2$/g that had been post-aged (that is, aged after the application of Pt) for 24 hours at 800° C. (solid squares).

DETAILED DESCRIPTION OF THE PREFERRED EMBODIMENTS

This invention is directed to a method for treating exhaust gases produced by an automotive diesel engine. i.e., for the purification of diesel exhaust gases containing nitrogen oxides (NOx), carbon monoxide (CO), and hydrocarbons (HC). Diesel engines operate in an air/fuel ratio generally of about 19–40, i.e., oxygen-rich of stoichiometric. The method comprises providing the present invention lean-NOx catalyst in an exhaust gas passage of a diesel engine and exposing the diesel exhaust gases to the lean-NOx catalyst. The lean-NOx catalyst comprises at least 0.25 weight percent precious metal selected from the group consisting of platinum, rhodium, palladium, and a mixture of any of them, preferably comprising at least platinum, impregnated from a solution thereof onto an aerogel titania support material. The weight percent of the precious metal is based on the weight of the aerogel titania support.

The precious metal catalyst is preferably loaded on the support in an amount of 0.25 to 5 weight percent, more preferably being about 0.5 to 3 weight percent, optimally being about 2 weight percent, based on the weight of the support. While it is most preferable to use at least platinum and optimally only platinum as the precious metal catalyst, a mixture of any of platinum, rhodium, and palladium may be used. When a mixture of platinum and rhodium is used, which is the preferred mixture, the weight ratio of platinum-:rhodium is up to about 50:1. It is most desirable to use only platinum because of the cost of the other precious metals, however, including rhodium is desirable because the efficiency in conversion of the nitrogen oxides is increased. In manufacturing the invention lean-NOx catalyst, the precious metal catalyst is loaded onto the aerogel support from a solution of the precious metal. Thus the present invention catalyst comprises a precious metal carried on the surface of the aerogel support.

The porous support (washcoat) material loaded with the catalyst is a high surface area washcoat aerogel titania material. The preparation of titania aerogels is well known to those skilled in the art as evidenced by the article to Schneider et al discussed above, whose teachings of aerogels are specifically incorporated by reference herein. For example, in one preferred method the titania aerogel is prepared by first dissolving a titanium alkoxide like titanium butylate in a solvent like methanol. Then water in methanol may be added to the titanium butylate solution under nitrogen with stirring to hydrolyze the alkoxide. The resultant gel is aged and then broken up by adding methanol which is later removed by supercritical extraction in an autoclave under nitrogen. The titania aerogel powder which results is then generally calcined at, e.g., 300° C. for several hours.

The titania aerogel support material may additionally comprise small amounts, i.e., up to about 30% based on the total weight of the titania aerogel support, of other materials like cerium oxide, barium oxide, zirconium oxide, lanthanum oxide, silica, and alumina like alpha-alumina. Desirably, the aerogel titania support material has a surface area between about 5 and 300 m$^2$/g. Still other techniques for making a titania aerogel will be apparent to those skilled in the art in view of this disclosure.

For useful application as a lean-burn catalyst in the diesel exhaust gas system, the titania support (washcoat) will be carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. The preferred mechanical carrier is comprised of a monolithic magnesium aluminum silicate structure (i.e. cordierite), although the configuration is not critical to the catalyst of this invention. It is preferred that the surface area of the monolithic structure provide 50–1000 meter square per liter structure, as measured by N$_2$ adsorption. Cell density should be maximized consistent with pressure drop limitations and is preferably in the range of 200–800 cells per square inch of cross-sectional area of the structure. Still other materials and configurations useful in this invention and suitable in an exhaust gas system will be apparent to those skilled in the art in view of the present disclosure.

The precious metal may be impregnated onto the titanium aerogel and then applied onto the substrate from, e.g., a slurry, or in sequential steps, i.e., an aerogel titania washcoat being applied first to the substrate and then the precious metal impregnated onto the titania aerogel washcoat. Optimally, the washcoat is provided on the substrate in an amount of between about 25% and 35% by weight based on the weight of the substrate (e.g., monolith). Then the catalysts can be deposited on the washcoat by impregnation techniques well known to those skilled in the art. According to such techniques, a soluble salt of precious metal catalysts, individually or together, would be dissolved in an aqueous or organic solvent to form a solution which is then impregnated into the titania aerogel washcoat. The particular precursor for the precious metal is not critical to this invention. Exemplary platinum containing compounds include chloroplatinic acid, amino-platinum-nitrates and platinum-carboxylates. Any platinum compound which is soluble in an aqueous or organic medium and whose functional group is capable of being decomposed by heat to leave the precious metal on the support material may be employed in this impregnation technique. The decomposition of the functional group generally takes place when the lean-NOx catalyst is subjected to the elevated temperatures of the catalyst system. For rhodium, soluble precursors include rhodium nitrate and rhodium chloride. Other precious metal precursor compounds useful in this invention in addition to those listed above will be apparent to those skilled in the art in view of this disclosure. In the case of platinum, in air at elevated temperatures it is oxidized to platinum oxide which at still higher temperatures decomposes to platinum and oxygen. Thus it often exists on the support as a mixture of platinum and its oxides. Exemplary of useful solvents for precious metal precursors are water, an aqueous solution of alkalis like sodium hydroxide, and organic solvents like ethanol, toluene, isopropyl alcohol, acetone, methylethylketone, butylacetate, and dimethylformamide.

Although not necessary to treat the diesel exhaust gases as broadly disclosed herein, most preferably, the catalyst system will be combined with a trap for diesel particulate emissions. Many diesel particulate traps are known to those skilled in the art and selection would be apparent in view of the present disclosure.

Advantageously, we have found that by using the lean-NOx catalyst disclosed herein to treat diesel exhaust gases, the NOx conversion efficiency of the catalyst is maintained even in the presence of sulfur in the exhaust gas. While not wishing to be bound by theory, we believe that the excellent resistance to sulfur poisoning and excellent NOx conversion are due to the following. Using the titania aerogel we get a high-surface area, sulfur-tolerant support without the metal-support interactions that are typical of conventional high-surface area titania supports. It is believed that excessive hydroxylation of conventionally prepared titania supports of high surface area may contribute to this metal-support effect. Suppression of the detrimental metal-support interaction on the titania aerogel compared to conventional titania supports of high surface area ultimately allows the presence of an increased number of surface-exposed platinum atoms that are available for the NOx conversion reaction. Neither the accuracy nor the understanding of this theory is necessary however for practice of the present invention. In addition, as disclosed from the following examples, the present invention catalyst operates efficiently to reduce the NOx concentration at lower temperatures than conventional lean-NOx catalysts.

EXAMPLE 1

This example describes preparation of a lean-NOx catalyst useful to treat diesel exhaust gases according to an embodiment of the present invention. The titania aerogel support is prepared as follows. Under nitrogen, 21.3 g of titanium (VI) butylate obtained from Johnson Matthey is dissolved in 80 ml of methanol to prepare solution A. Solution B contains 4.5 ml of water and 0.325 ml of nitric acid in 20 ml of methanol. While vigorously stirring solution A under nitrogen, add solution B to it to hydrolyze the alkoxide. The resulting, clear yellow gel is then aged for at least 4 hours. Subsequently, the gel is broken up by adding 48 ml of methanol to it, followed by vigorous stirring for about 30 minutes. For the supercritical extraction of the solvent, the gel is placed in an autoclave. The air is purged out of the vessel using pressurized nitrogen. The vessel is pressurized to 1200 psig using nitrogen. The autoclave is heated from room temperature to 250° C. in 20 hours. At this temperature, the supercritical solvent is purged out of the vessel by using several doses of pressurized nitrogen. Subsequently, the autoclave is cooled to room temperature. The resulting, white titania aerogel powder is calcined at 300° C. for 5 hours, then at 500° C. for 5 hours. A 1 wt. % Pt on $TiO_2$ aerogel catalyst is prepared by immersing 5 g of the titania aerogel in an aqueous solution containing 0.134 g of hydrochloroplatinic acid. After drying, this 1 wt. % Pt/titania aerogel sample is calcined at 500° C. for 5 hours. Tests are carried out on the examples herein according to the Procedures detailed below.

TEST PROCEDURES

Procedure A: BET surface area determination. BET surface areas are measured on a Micromeritics ASAP-2400 instrument using physical adsorption of nitrogen. Results of Procedure A are shown in Table 1 for Examples 2 and 5–7.

Procedure B: Total carbon monoxide adsorption. Apparent Pt dispersion of the catalysts is measured using CO chemisorption. Adsorption isotherms are determined gas-volumetrically (Micromeritics, ASAP 2010C chemisorption analyzer). The procedure is as follows. During in-situ pretreatment the catalyst sample is heated to the reduction temperature (250° or 400° C.) where it is held for 2 hours in flowing $H_2$ (Michigan Airgas, grade 6). After evacuation at the reduction temperature for 1 hour, the sample is cooled in vacuum to the temperature of adsorption ($T_{Ads}$ = 35° C.). First, the total CO adsorption isotherm is measured between 40 and 200 Torr (1 atm=760 Torr). Total amounts of adsorbed gas are determined by extrapolation of the asymptotic part of the total adsorption isotherms to zero pressure. Results of Procedure B are shown in Table 2 for Examples 1–3.

Procedure C: Irreversible carbon monoxide adsorption. Immediately subsequent to Procedure D, the reversible CO adsorption isotherm is measured after a 15-min evacuation. Reversible amounts of adsorbed gas are determined by extrapolation of the asymptotic part of the respective isotherms to zero pressure. Irreversibly held CO is calculated as the difference between total and reversible adsorption of CO. For apparent dispersion measurements, we rely on irreversibly adsorbed CO and an adsorption stoichiometry of CO/Pt=1. The pseudo dead-volume of the sample cell at the adsorption temperature is determined using He (Michigan Airgas, grade 6).

The results of Procedure C are shown in Table 2 for Examples 1–3. Low temperature reduction (200° C.) of the rutile-supported Pt catalyst of Example 3 minimizes the formation of TiOx species. The small amount of reversibly adsorbed CO corroborates the absence of the strong metal-support interaction for the rutile carrier. The apparent dispersion based on irreversibly adsorbed CO is about 26%. For the rutile-supported catalyst reduced at high temperature (400° C.), CO adsorption is less. Moreover, the amount of reversibly adsorbed CO increases considerably to about 5.3% CO/Pt. For the anatase 41- support supported Pt catalyst of Example 2, low-temperature reduction yields high total CO adsorption. The amount of reversibly adsorbed CO is also high. CO adsorption on the aerogel-supported Pt catalyst of Example 1 shows by far the largest pool of reversibly held CO for the catalysts studied. Even so, the pool of irreversibly held CO corresponds to 52.5% of Pt. This high apparent metal dispersion suggests that the hydrogen reduction treatment at 200° C. is not severe enough to cause significant formation of TiOx species on the metal. Rather, it seems that CO is adsorbing reversibly on a highly hydroxylated support.

Procedure D: Reaction analysis without sulfur. The catalysts of the example are placed in a quartz flow reactor and characterized under lean-burn conditions. Gases are blended to form a simulated lean-burn exhaust gas (of either gasoline or diesel) in a manifold by means of mass flow controllers. The gases flow through the reactor and the post-catalyst gases later flow to an analytical train to determine the extent of reactions on various components of the gas, especially the NOx. The space velocity and the simulated feed gas composition are as follows:

MOLAR FEED GAS COMPOSITION:
space velocity=25,000 $h^{-1}$
propane=500 ppm
propene=1,000 ppm
carbon monoxide=1,000 ppm
hydrogen=333 ppm
nitric oxide=500 ppm
oxygen=8.6% carbon dioxide=9%
water=7.5%
sulfur dioxide=0 ppm
nitrogen=balance.

Figure 1:
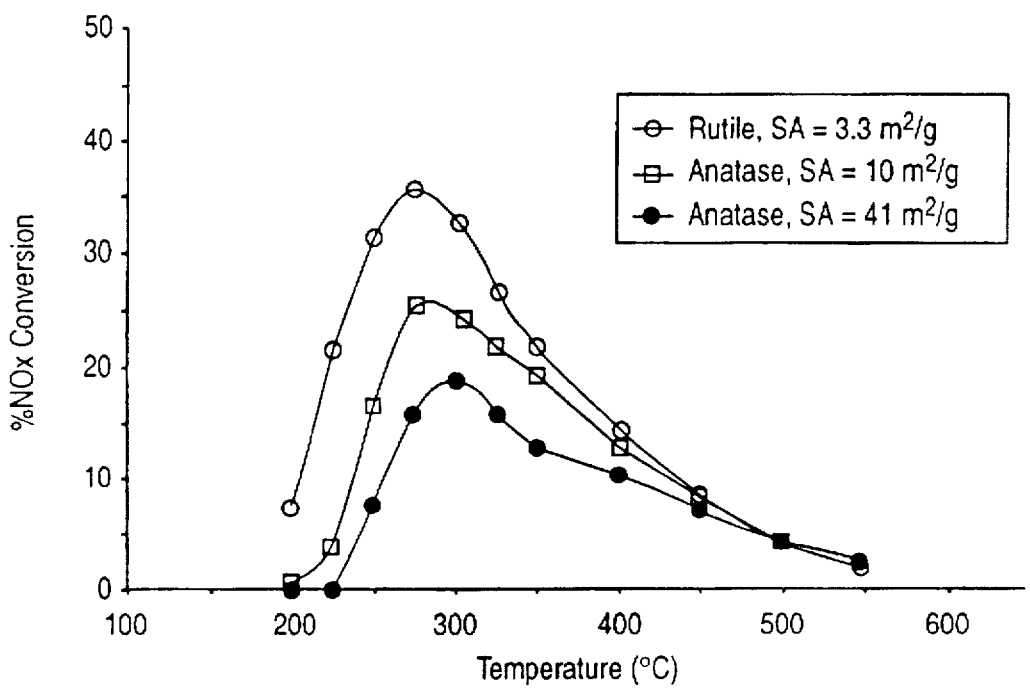
FIG. 1 is a graph which shows NOx conversion as a function of catalyst temperature for three comparative catalysts using a simulated exhaust gas without sulfur.

Results of Test Procedure D are shown in FIG. 1 for Examples 2–4 and in FIG. 3 for Examples 2 and 5–8 and will be discussed with the respective example.

Procedure E: Reaction analysis with sulfur. This procedure is similar to Procedure D, except that the sulfur dioxide concentration is now 15 ppm which is more in accord with real vehicle exhaust conditions. Balance nitrogen is adjusted to maintain the same overall gas flow as in Procedure D.

Results of Procedure E are shown in FIG. 2 for Examples 1–4 and in FIG. 4 for Examples 2 and 5–8. For Example 1, FIG. 2 shows that the maximum NOx conversion is 34% whereas on the control sample with high BET surface area (Example 2) the maximum NOx conversion is 17%. In addition, the NOx conversion of Example 1 is higher over a wider temperature range (250°–450° C.). Thus it can be seen that following the aerogel preparation method effectively improves the NOx conversion in a simulated lean-burn exhaust containing sulfur.

TABLE 1

Anatase calcined at 800° C.

| Aging Time (hrs) | BET Area ($m^2/g$) |
| --- | --- |
| 0 | 45 |
| 3 | 12 |
| 6 | 9.3 |
| 24 | 7.4 |

TABLE 2

CO Adsorption at 35° C.

| Catalyst support | Reduction (°C.) | $CO_{tot}/Pt$ (%) | $CO_{irrev}/Pt$ (%) |
| --- | --- | --- | --- |
| Rutile | 200 | 28.2 | 26.0 |
| Rutile | 400 | 23.8 | 18.5 |
| Anatase41 | 200 | 45.2 | 12.2 |
| Aerogel | 200 | 155 | 52.5 |

EXAMPLE 2
(CONTROL SAMPLE)

A 1 wt-% $Pt/TiO_2$ catalyst is prepared as in Example 1, except that the calcined titania aerogel support is substituted by a conventional titania (non-aerogel) support available from Johnson Matthey with a surface area of 45 $m^2/g$. The titania is in the anatase phase. This sample is selected as the control sample since conventional wisdom suggests that the Pt catalyst on the support with the highest surface area would be expected to have the highest NOx efficiency. Results of Procedures B and C on the catalyst of this example are shown in Table 2. Results of Procedures A, D, and E are shown in Table 1 and FIGS. 1 and 2, respectively. In essence, these results show that the control catalyst prepared using a conventional high surface area titania support has lower apparent Pt dispersion, exhibits stronger metal-support interaction, and has lower NOx conversion than the catalyst of this invention.

EXAMPLE 3

This is a comparative example, not according to the present invention. A 1 wt-% $Pt/TiO_2$ catalyst is prepared as in Example 1, except that the calcined titania aerogel support of Example 1 is substituted by a conventional titania (non-aerogel) support available from Johnson Matthey with a surface area of 3.3 $m^2/g$. The titania is in the rutile phase. Results of Procedures B and C on the catalyst of this example are shown in Table 2. Results of Procedures D and E are shown in FIGS. 1 and 2, respectively. Surprisingly, the test results of Procedure E (FIG. 2) indicate that the catalyst of Example 3 has a higher maximum NOx conversion than the control sample (24 vs. 17%, respectively) even though the latter sample's support has a higher surface area (3.3 vs. 45 $m^2/g$, respectively).

EXAMPLE 4

Another comparative example of 1 wt-% $Pt/TiO_2$ catalyst is prepared as in Example 2, using a conventional titania support available from Johnson Matthey with a surface area of 10 $m^2/g$ rather than an aerogel titania support. The titania is in the anatase phase. Results of Procedures D and E on the catalyst of this example are shown in FIGS. 1 and 2, respectively. Surprisingly, the test results of Procedure E (FIG. 2) indicate that the catalyst of Example 4 has a higher maximum NOx conversion than the control sample (22 vs. 17%, respectively) even though the latter sample's support has a higher surface area (10 vs. 45 $m^2/g$, respectively).

EXAMPLES 5, 6, AND 7

The 1 wt-% $Pt/TiO_2$ catalysts of Examples 5–7 are prepared similar to the catalyst of Example 2 except that the conventional titania support (45 $m^2/g$) is pre-treated in static air at 800° C. for 3, 6, and 24 h, respectively, before applying Pt. Treatment at this elevated temperature transforms the titania from anatase to the less interactive rutile phase and, consequently, decreases the BET surface area of the support (Table 1). Results of Procedures A, D, and E on the catalysts of these examples are shown in Table 1 and FIGS. 3 and 4, respectively. The results in FIG. 3 and 4 generally indicate that the pre-aged samples have higher NOx conversion than the catalyst with the unaged anatase support. The pre-aging results indicate how undoing the metal-support interaction can result in higher NOx conversions.

EXAMPLE 8

This comparative 1 wt-% $Pt/TiO_2$ catalyst is prepared by treating a sample of the catalyst of Example 2 in static air at 800° C. for 24 h. Results of Procedure E on the catalyst of this example are shown in FIGS. 4. The results indicate that the post-aged catalyst of this example has a far lower maximum NOx conversion than the pre-aged sample of Example 7 (8 and 18%, respectively). This indicates that support shrinkage during aging may cause additional activity loss due to accelerated conglomeration or encapsulation of the attendant metal.

EXAMPLE 9

A catalyst according to an embodiment of the present invention is prepared and evaluated as in Example 1, except that the final Pt loading corresponds to 0.5 wt-% of the $Pt/TiO_2$ aerogel catalyst. The maximum NOx conversion (using Procedure E) of this catalyst is 20% whereas that of the catalyst of Example 1 is 34%.

EXAMPLE 10

The comparative catalyst sample is prepared as in Example 2, except that Pt is applied using an aqueous solution of tetramine platinum (II) nitrate instead of hydrochloroplatinic acid so that the final metal loading is 1 wt-% Pt/TiO$_2$. This catalyst has maximum NOx conversion (Procedure E) of 20% whereas that of the catalyst of Example 2 is 17%. The higher activity of the catalyst of this example is due to the absence of residual chlorine.

EXAMPLE 11

A 0.25% Rh/1.8% Pt/TiO$_2$ aerogel catalyst is prepared according to the procedure described in Example 1 using a rhodium solution of desired concentration. This catalyst is evaluated using the identical feed gas and test procedures described in Example 1. The maximum NOx conversion (using Procedure E) of this catalyst is 34%.

EXAMPLE 12

A 0.30% Pd/1.5% Pt/TiO$_2$ aerogel catalyst is prepared using the method described in Example 1. A palladium nitrate solution of appropriate concentration is used to form the desired catalyst. The catalyst has maximum NOx conversion (Procedure E) of 34%.

It should be noted that unexpectedly, for the catalysts prepared from the conventional titania supports, those supports with lower surface areas result in higher NOx conversions. While not wishing to be bound by theory, it is believed that excessive hydroxylation of the conventional titania support may be responsible for a strong metal-support interaction that prevents the dispersed Pt from effectively participating in NO conversion during the reaction. Thus, while Procedure B indicates high apparent dispersion of Pt for the conventional titania support of high surface area, Procedure C and E indicate that the dispersed Pt is somehow impeded from participating in the reaction, possibly due to a metal-support interaction. Consequently, it is believed that the present invention aerogel titania supports provides both a higher surface area and also noninteracting (with precious metal) support that results in higher NOx conversion.

We claim:

1. A method for treating exhaust gases, including sulfur dioxides, generated by a diesel engine to convert hydrocarbons, carbon monoxide and nitrogen oxides therein, which method comprises the steps of:

providing a sulfur-resistant lean-NOx catalyst in the exhaust gas system of said diesel vehicle; and exposing said exhaust gases to said catalyst, said sulfur resistant lean-NOx catalyst comprising at least 0.25 weight percent precious metal selected from the group consisting of platinum, palladium, rhodium, and mixtures of any of them, impregnated from a solution thereof, onto an aerogel titania support, the weight percent of the precious metal being based on the weight of the aerogel titania support.

2. The method for treating diesel exhaust gases according to claim 1 wherein said precious metal is loaded on said support in an amount of 0.5 to 5 weight percent, based on the weight of said support.

3. The method for treating diesel exhaust gases according to claim 2 wherein said precious metal is loaded on said support in an amount of about 0.5 to 3 weight percent.

4. The method for treating diesel exhaust gases according to claim 3 wherein the precious metal catalyst is loaded on said support in an amount of about 2 weight percent.

5. The method for treating diesel exhaust gases according to claim 1 wherein said catalyst comprises platinum and rhodium in a weight ratio of platinum:rhodium up to 50:1.

6. The method for treating diesel exhaust gases according to claim 1 wherein said precious metal catalyst comprises platinum.

7. The method for treating diesel exhaust gases according to claim 6 wherein said precious metal catalyst consists of platinum.

8. The method for treating diesel exhaust gases according to claim 1 which further comprises the step of contacting said exhaust gases with a particulate trap positioned upstream of said lean-burn catalyst in said exhaust gas system.

9. A method for treating exhaust gases, including sulfur dioxides, generated by a diesel engine of an automotive vehicle to convert hydrocarbons, carbon monoxide and nitrogen oxides therein, which method comprises the steps of:

providing a sulfur-resistant lean-NOx catalyst in the exhaust gas system of said diesel vehicle; and exposing said exhaust gases to said catalyst, said sulfur resistant lean-NOx catalyst comprising at least 0.25 to 5 weight percent precious metal selected from the group consisting of platinum, palladium, rhodium, and mixtures of any of them, impregnated from a solution thereof, onto an aerogel titania support, the weight percent of the precious metal being based on the weight of the aerogel titania support.

* * * * *